United States Patent [19]

Nielson

[11] 3,928,729

[45] Dec. 23, 1975

[54] CIRCUITRY FOR PROVIDING EXECUTIVE RINGBACK IN A PBX SYSTEM IN ACCORDANCE WITH A SUPPLIED CLASS OF SERVICE

[75] Inventor: Carl Calvin Nielson, Boulder, Colo.

[73] Assignee: Bell Telephone Laboratories, Incorporated, Murray Hill, N.J.

[22] Filed: Oct. 3, 1974

[21] Appl. No.: 511,802

[52] U.S. Cl. .............................................. 179/18 BG
[51] Int. Cl.[2] .............................................. H04M 3/48
[58] Field of Search ............. 179/18 BG, 18 B, 84 B

[56] References Cited

UNITED STATES PATENTS 3,854,014 4/1973 Akin et al. ...................... 179/18 BG

*Primary Examiner*—William C. Cooper
*Attorney, Agent, or Firm*—C. S. Phelan

[57] ABSTRACT

In a telephone switching system wherein a plurality of line circuits are terminated in station sets, the line circuits are interconnectable to a plurality of trunk circuits through a multistage switching network. A call originated by a calling party to a called party, engaged in a conversation with a third party, is automatically completed at the conclusion of the conversation between the called party and the third party by ringing back the calling party and the called party provided both parties are equipped with a class of service which permits executive ringback. The ringback feature is initiated by the calling party upon receipt of a special busy signal by a flashing of his switchhook.

14 Claims, 4 Drawing Figures

CIRCUITRY FOR PROVIDING EXECUTIVE RINGBACK IN A PBX SYSTEM IN ACCORDANCE WITH A SUPPLIED CLASS OF SERVICE

BACKGROUND OF THE INVENTION

1. Field of the Invention

This invention relates to Private Branch Exchange (PBX) switching systems and, in particular, to circuitry for providing an executive ringback feature.

2. Description of the Prior Art

In prior art PBX systems the ability of a calling party to be rung back after placing a call to a called party, busy as a result of a conversation with a third party, required the calling party, upon receipt of a busy signal, either to hang up and then dial a special ringback code followed by the directory number of the busy called party or to flash his switchhook and then dial in a time code when callback was to be attempted. One of the disadvantages in implementing executive ringback in accordance with the first approach is that the calling party must first hang up upon receipt of the busy signal. Another disadvantage is that special circuitry must be provided in the PBX to recognize the special code required to initiate an executive ringback sequence. A third disadvantage is that the calling party must redial the directory number of the busy called party once the PBX system has been alerted that an executive ringback request has been made. A disadvantage with the second approach is that the called party may have completed his conversation with the third party a substantial time period prior to ringback and, as a result, he may no longer be in the area of his station set. Hence, although ringback is implemented it is of little utility.

These disadvantages have been substantially circumvented by the executive ringback circuitry disclosed in the copending application of E. W. Sobanski Case 3, filed concurrently with this application. However, the executive ringback circuitry as disclosed by Sobanski has a disadvantage in that once a request for executive ringback is made the called party's line is rendered incapable of accepting other incoming calls regardless of whether or not the called party is in a class of subscribers who permit implementation of executive ringback connections. For example, a junior executive in a corporation could request executive ringback at the conclusion of a call between the president of the corporation and a third party so long as the junior executive is provided with a class of service which allows him to effect an executive ringback connection. By so doing the junior executive could preclude the president from accepting calls from the chairman of the board of directors until he has completed his conversation with the president. Quite obviously, executive ringback service implemented in this manner suffers a serious drawback from the corporate president's point of view.

Accordingly, it is one object of the present invention to implement an executive ringback feature which is depending upon the class of service provided to both the calling and called parties.

Another object is to provide executive ringback service in accordance with a hierarchical arrangement whereby various grades of executive ringback service are available to a broad range of possible users.

Yet another object of the present invention is to refrain from implementing an executive ringback connection to a busy called party until his class of service has been ascertained and adequate warning has been given that an executive ringback call awaits the termination of his call to the third party.

Still another object is to effect the ringback immediately upon the called station going idle after completion of the conversation with the third party.

SUMMARY OF THE INVENTION

These and other objects of the invention are realized in accordance with an illustrative embodiment of a telephone switching system having a plurality of line circuits terminated in station sets wherein the line circuits are interconnectable to a plurality of trunk circuits through a multistage switching network. Any calling station is able to effect an executive ringback function at the conclusion of a connection between a busy called station and a third party station provided the calling station is supplied with a class of service which permits executive ringback and the called station is supplied with a class of service which allows executive ringback. Following detection of the class of service supplied to the calling station, a busy/idle check and a class of service check are made of the called station. If the called station is busy and is equipped with a class of service which allows executive ringback, an executive ringback trunk is seized and a special busy signal is returned to the calling station. Actuation of the executive ringback sequence is initiated by a switchhook flash at the calling station. In response to the switchhook flash, an executive ringback signal is supplied to the called station and a similar signal acknowledging the request for executive ringback is returned to the calling station.

Accordingly, it is one feature of the present invention that a class of service check of the calling station, a busy/idle check, and a class of service check of the called station are made before an executive ringback trunk is seized.

Another feature of the present invention is that a connection is established through the network from an entitled calling station to the executive ringback trunk and through the network from the executive ringback trunk to an entitled called station in response to the detection of a busy condition of the entitled called station.

A further feature is that a switchhook flash by the entitled calling station following the receipt of the special busy signal is recognized as an executive ringback request signal by the ringback trunk and enables the trunk thereby establishing an executive ringback connection between the entitled calling station and the entitled called station.

Yet another feature is that an executive ringback warning signal is supplied to the entitled called station and a similar signal acknowledging acceptance of the executive ringback request is supplied to the entitled calling station following the switchhook flash at the calling station.

Still another feature of the present invention is that a ringing signal is supplied to the entitled called station if the called station goes idle before switchhook flash by the entitled calling station.

DESCRIPTION OF THE DRAWINGS

These and other objects and features of the invention will become more apparent upon consideration of the following detailed description and appended claims in connection with the attached drawings of an illustrative embodiment in which:

FIG. 4 is placed adjacent to the bottom of FIG. 3, is an illustrative embodiment of an executive ringback trunk circuit.

DETAILED DESCRIPTION

Figure 2:
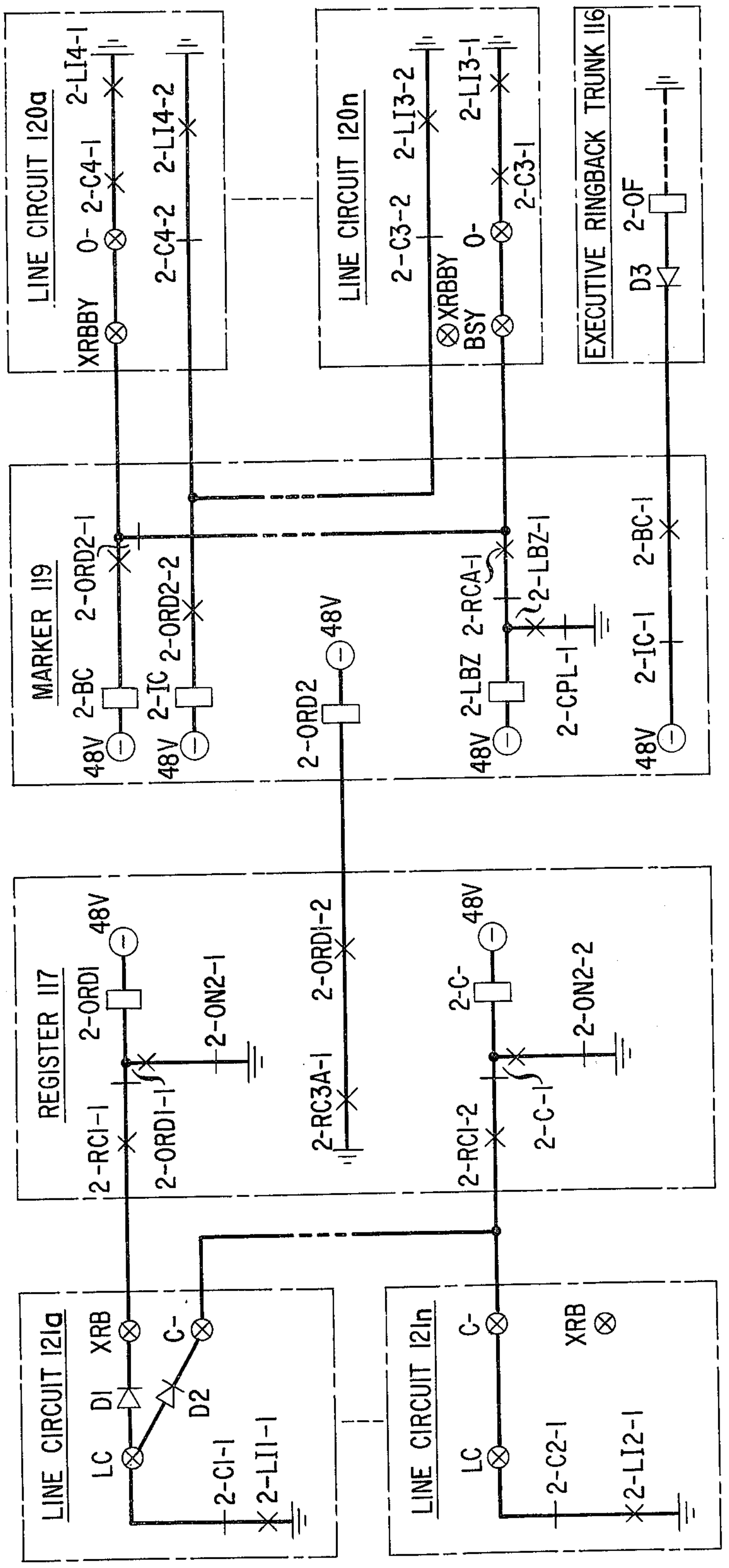
FIG. 2 is a detached contact schematic illustrating the manner in which the class of service of the calling and called station is determined and the manner in which the executive ringback trunk is seized.
Figure 3:
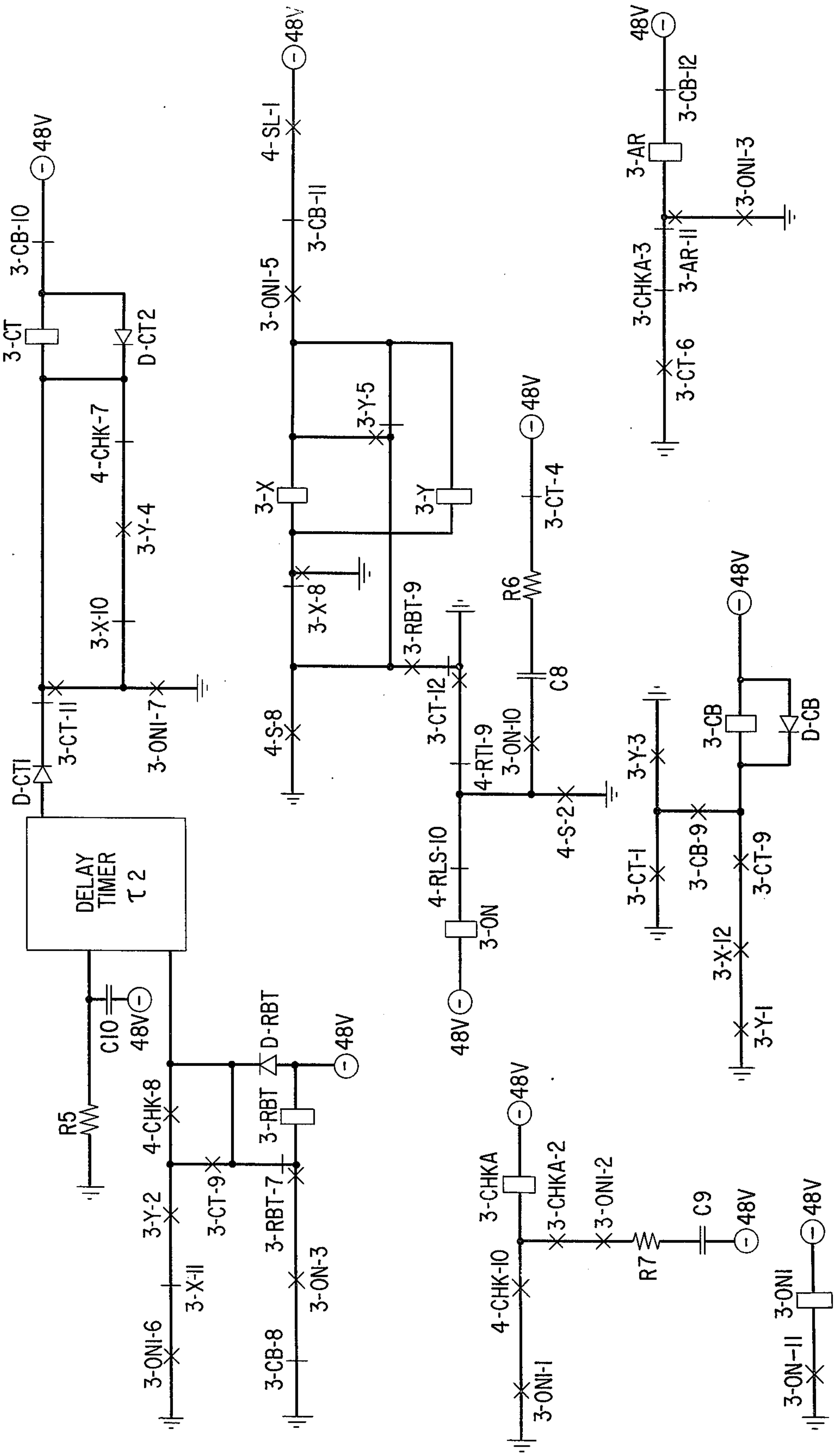
FIGS. 3 and 4, when
Figure 4:
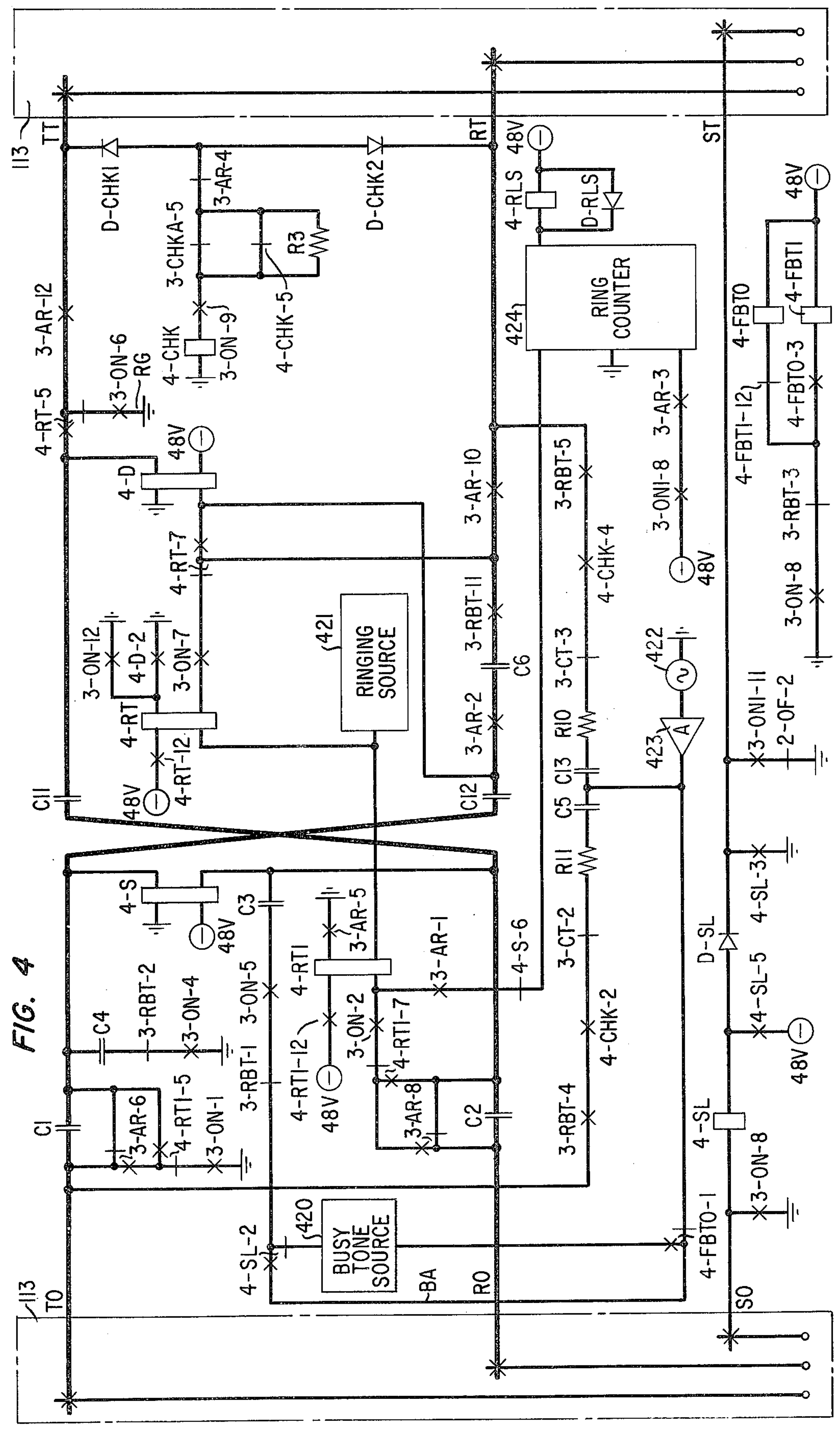

It should be noted that FIGS. 2 through 4 employ a type of notation referred to as "detached contact" in which an "X", shown intersecting a conductor, represents a normally open contact of a relay and a bar, shown intersecting a conductor at right angles, represents a normally closed contact of a relay; "normally" referring to the unoperated condition of the relay. The principles of this type of notation are described in an article entitled "An Improved Detached Contact Type Schematic Circuit Drawing" by F. T. Meyer in the September 1955 publication of the *American Institute of the Electrical Engineers Transactions, Communications and Electronics*, Vol. 74, pages 505–513.

It should be noted also that in order to simplify the disclosure and thus facilitate a more complete understanding of the embodiment, relays, relay contacts and other electromechanical devices, shown in FIGS. 2 through 4, have been given systematic designations. Thus, the number preceding the letter designation of each device corresponds to the figure in which the control circuit of the device is shown. For example, the control circuit for relay BC is shown in FIG. 2, and therefore, relay BC is referred to as 2-BC. Each relay contact, whether make, break or transfer, is shown with its specific contact number preceded by the designation of the relay to which it belongs. As an example, the notation 3-X-8 indicates contact number 8 of the X relay, the control circuit of which is shown in FIG. 3.

1.1 General Description

Figure 1:
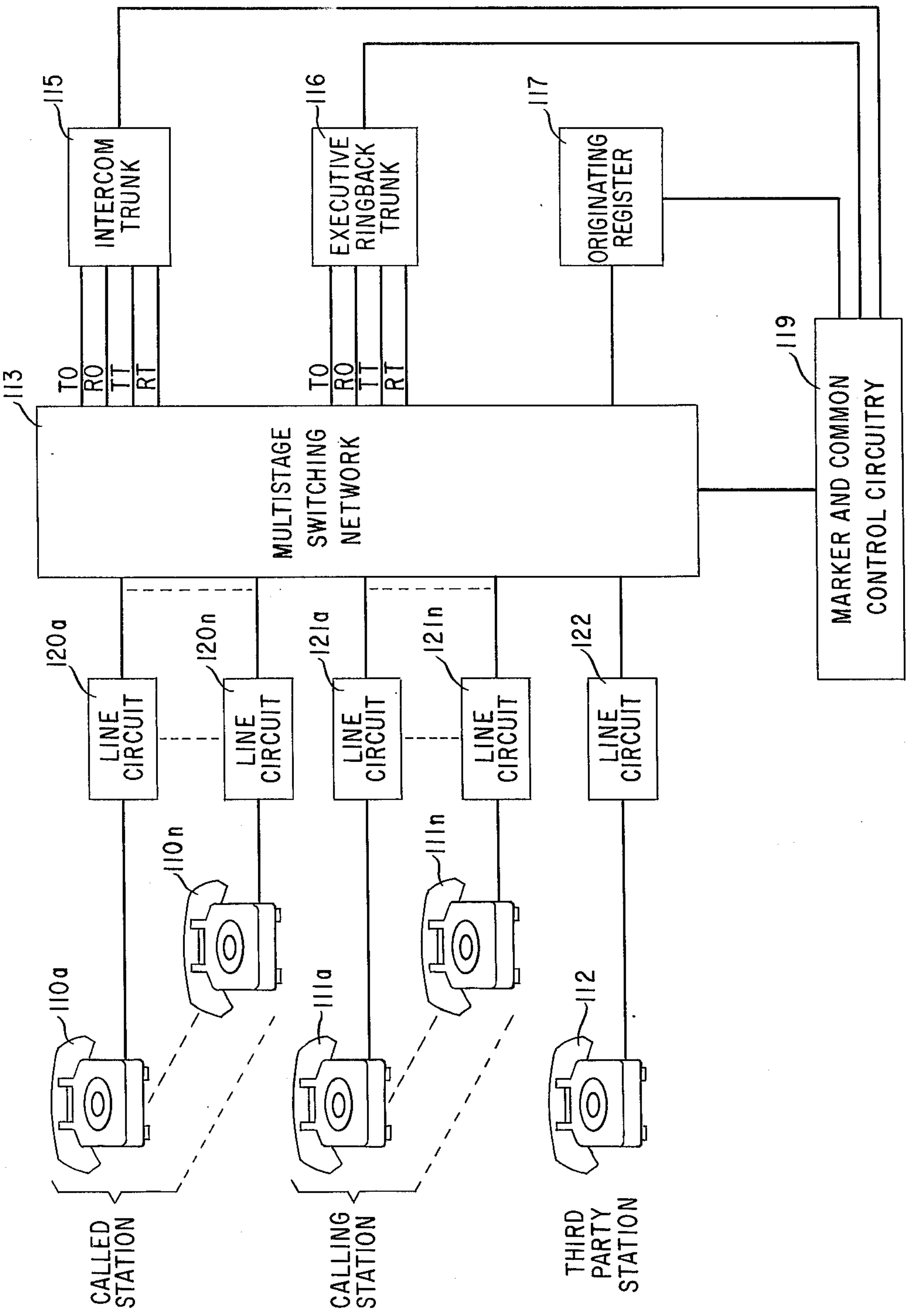
FIG. 1 is a generalized schematic representation of a network connection for providing executive ringback.

It should be noted, as shown in FIG. 1, that a number of called stations 110*a* through 110*n* and a number of calling stations 111*a* through 111*n* are connected to a multistage switching network 113 through line circuits 120*a* through 120*n* and through line circuits 121*a* through 121*n*, respectively. Also connected to the multistage switching network 113 is a third party station 112. The third party station 112 also connects through a line circuit 112. It is to be appreciated that each of the called stations 110*a* through 110*n* may also be used, at some point in time, as a calling station. Similarly, each of the calling stations 111*a* through 111*n* may, at some point, function as a called station. Accordingly, each station has a double class of service associated therewith. For example, called station 110*a* may have a class of service which allows implementation of an executive ringback function on calls placed to it, as well as having a capability to effect an executive ringback function on calls placed from that station. This double class of service arrangement gives rise to a hierarchical executive ringback organization whereby various grades of executive ringback service are available.

For instance, in a corporate environment a given station utilized by a clerk may be denied the ability to effect executive ringback on calls placed from it but may permit ringback on calls placed to it. A station utilized by a junior executive in the corporation may have the capability to effect ringback on calls placed from it but also have the capability of accepting ringback following calls placed to it. A station utilized by an individual in the personnel organization may be equipped with a class of service which does not permit it to effect a ringback function and also does not allow ringback following calls placed to it. Finally, the station utilized by the corporate president may have the capability to effect executive ringback but it does not allow ringback following calls placed to it. For purposes of this description, the calling station 111*a* is assumed to have a class of service which permits it to effect executive ringback. Calling station 111*n* is assumed to have a class of service which does not permit it to effect executive ringback. Correspondingly, called station 110*a* is assumed to have a class of service which permits ringback following calls placed to it and, called station 110*n* is assumed to have a class of service which does not permit ringback following calls placed to it.

Before an executive ringback feature takes on any significance there must be a connection between one of the called stations 110, say 110*a*, as shown in FIG. 1, and the third party station 112. This interconnection is effected through an intercom trunk 115 and the multistage switching network 113 operating under the control of a marker 119 in a manner, for example, similar to that set out at column 18 et seq. of H. H. Abbott et al. U.S. Pat. No. 2,949,506 issued Aug. 16, 1960.

When the calling station 111*a*, which is assumed to be provided with a class of service which allows executive ringback, attempts to place a similar call to the called station 110*a*, which is assumed to be provided with a class of service which permits ringback following calls placed to it, the calling station 111*a*, upon detection of the busy condition of the called station 110*a* by the marker 119, is connected to an executive ringback trunk circuit 116. Ascertainment of whether the calling station 111*a* has the requisite class of service to allow executive ringback is effected by class of service check circuitry partially located in an originating register 117 and partially located in the marker 119. The determination of the class of service of the called station 110*a*, on the other hand, is implemented by the marker 119. In addition to the class of service check, a busy/idle check of the called station 110*a* is made by the marker 119. If the called station 110*a* is busy and is equipped with a class of service which allows executive ringback, the marker 119 seizes an idle executive ringback trunk 116.

Upon the seizure of the executive ringback trunk 116 a special busy signal is returned through the trunk circuit to the calling station 111*a*. A request for implementation of the executive ringback feature is made by the calling station 111*a* by a flashing of its switchhook. Upon receipt of the switchhook flash signal the ringback trunk circuit 116 is connected to the entitled called station 110*a*. The switchhook flash by the calling station 111*a* causes the special busy signal to be removed and a ringback signal to be supplied to both the calling station 111*a* and the called station 110*a*. At this point the calling station 111*a* may go on-hook and the crosspoint connection through the multistage switching network 113 to the executive ringback trunk 116 is maintained. When the called station 110*a* returns to an idle condition, a ringing signal is supplied to both the called station 110*a* and the calling station 111*a*. If both stations respond to the ringing signal by going off-hook a talking path between the called station 110*a* and the calling station 111*a* is completed through the executive ringback trunk 116.

If the called station 110a goes idle sometime after the executive ringback trunk 116 has been seized, but prior to flashing of the switchhook by the calling station 111*a*, the switchhook flash by the calling station 111*a* causes the special busy signal to be removed and the called station 110*a* is immediately rung via the executive ringback trunk circuit 116.

1.2 Calling Station Class of Service Check

Executive ringback capability is provided only to those calling stations 111 which have been supplied with a classof service which permits executive ringback. A check of the executive ringback class of service of the calling station 111 is effected by circuitry of the type shown in FIG. 2. When a calling station 111 goes off-hook a switchhook contact (not shown) is closed. This contact closure activates a line relay, similar to line relay L30 shown in FIG. 35 of the aforementioned Abbott et al. patent, in line circuit 121 and provides a service request indication to the marker 119, as shown in FIG. 1, for an idle register of the type illustrated by originating register 117. All of the foregoing actions occur whenever a calling station 111 in a PBX system goes off-hook, as set out in the previously mentioned Abbott et al. patent, and are included in this description only for purposes of illustrating how an idle register 117 is seized for a calling station 111.

With the marker 119 having found an idle register 117, the class of service of the calling station 111 is forwarded to the register 117 and, in turn, is passed to the marker 119. An illlustration of the method in which the class of service information is routed to the marker is shown in FIG. 2 in simplified form. For the case where the calling station 111 is not provided with an executive ringback class of service that is, calling station 111*n*, there is no strapping between a line class crosspoint LC and an executive ringback crosspoint XRB. The absence of executive ringback class of service is noted by the nonactuation of a relay 2-ORDl. In this case calling station 111*n* is provided with a normal class of service an indication of which is transmitted to the register 117 by the supplying of a ground potential to actuate a relay 2-C-. This ground potential is routed from line circuit 121n through a normally open contact 2-LI2-l, a normally closed contact 2-C2-l, a normally open contact 2-RCl-2 and a normally closed contact 2-C-l. This relay 2-C- is held operated via a ground lock path containing a normally closed contact 2-ON2-2 and a normally open contact 2-C-l. Since the calling station 111*n* is not provided with an executive ringback class of service, call connections from this station are of no further interest in the present context.

In the case where the calling station 111 is provided with an executive ringback class of service, that is, calling station 111*a*, a connection between line class crosspoint LC and an executive ringback crosspoint XRB is completed through a diode D1. The executive ringback class of service information is supplied to the register 117 by the actuation of the 2-ORDl relay. This actuation is effected by supplying a ground to the relay 2-ORDl through a path containing a normally open contact 2-LFl-l, a normally closed contact 2-Cl-l, line isolation diode D1, a normally open contact 2-RCl-l and, a normally closed contact 2-ORDl-l. Relay 2-ORDl is held operated via a ground lock path containing a normally closed contact 2-ON2-l and normally open contact 2-ORDl-l. In addition to the executive ringback class of service which is supplied to the calling station 111*a*, a regular class of service is also supplied thereto. This class of service indication is transmitted to the register 117 by the actuation of the 2-C- relay by the application of a ground potential over a path containing normally open contacts 2-LIl-l and 2-RCl-2, normally closed contacts 2-Cl-l and 2-C-l and, a line isolation diode D2. As was the case with calling station 111*n* which was supplied with a class of service other than an executive ringback class of service, the other class of service supplied to calling station 111*a*, is of importance when the called station 110 is idle and the call is completed through the intercom trunk 115, but it is of no further interest in the present context and, additional discussion with respect thereto is unnecessary.

It should be noted that the normally open contacts 2-LIl-l and 2-RCl-l and the normally closed contact 2-Cl-l are part of a line identification relay, a line cutoff relay and a register connect relay, respectively, and are utilized in any type of PBX connection and, therefore, are included in this description for illustrative purposes only, since they form no essential part of the present invention.

With the actuation of the relay 2-ORDl the executive ringback class of service of the calling station 111*a* is passed to the originating register 117. This class of service is transmitted to the marker 119 by the actuation of a relay 2-ORD2. At this point dial tone is returned to the calling station 111*a* and the directory number of a called station 110 is dialed. Subsequent to the completion of dialing the marker 119 responds to the originating register bid and reads the calling station 111 class of service. The ground operate path for the relay 2-ORD2 includes normally open contacts 2-RC3A-l and 2-ORDl-2, the latter contact being closed upon the actuation of the relay 2-ORDl.

1.3 Busy/Idle Check and Class of Service Check of Called Station

When the directory number of the called station 110 (called station 110 including any of the called stations 110*a* through 110*n*) has been dialed, a dial complete bid is forwarded from the register 117 to the marker 119. The dial complete bid recalls the marker 119 in order to perform a busy/idle check of the called station 110. Busy verification checks are well documented in the prior art of which the E. L. Erwin et al. U.S. Pat. No. 3,410,960, issued Nov. 12, 1968 is an example. Accordingly, only a simplified version is included in the present disclosure for illustration purposes.

As was the case with the calling stations 111 in the illustrative example, one of the called stations 110 is supplied with a class of service which allows executive ringback and one of the stations is provided with a class of service which does not permit executive ringback. Called station 110*a*, because of the strapping between an O-crosspoint and an XRBBY crosspoint, illustrates the former. Called station 110*n*, because the O- crosspoint is not strapped to the XRBBY crosspoint, illustrates the latter. If the calling station 111*a* attempts to reach the called station 110*n* and this station is busy the busy/idle check performed by the marker 119 will result in the actuation of a line busy relay 2-LBZ. Actuation of the relay 2-LBZ causes the marker 119 to seize a busy tone trunk (not shown) and a normal busy signal is returned to the calling station 111*a*. The operate path for the relay 2-LBZ includes normally open contacts 2-LI3-1, 2-C3-1 and 2-RCA-1 and a normally closed contact 2-LBZ-1. Relay 2-LBZ is held operated by a ground path including a normally closed contact 2-CPL-1 and a normally open contact 2-LBZ-1.

Since the called station 110*n* is busy its line cutoff relay will be actuated and a normally closed contact 2-C3-2 will be opened thereby breaking the ground path to an idle check relay 2-IC. Because called station 110*n* has a class of service which precludes executive ringback it is of no further interest in the present context and further discussion with regard thereto is unnecessary.

Assuming that calling station 111*a* is attempting to reach called station 110*a* and, recalling that called station 110*a* is provided with a class of service which allows executive ringback, the busy/idle check and the class of service check performed by the marker 119 results in the detection of the busy condition and the executive ringback class of service. The detection of these two conditions results in the seizure of an idle executive ringback trunk circuit 116.

Transmission of the executive ringback class of service from the called station 110*a* to the marker 119 is effected by the actuation of a busy check relay 2-BC. The ground operate path for the actuation of the relay 2-BC includes normally open contacts 2-LI4-1, 2-C4-1 and 2-ORD2-1. Since called station 110*a* is busy its line cutoff relay will be actuated and the ground path to operate the idle check relay 2-IC is opened and, hence, the 2-IC relay remains in a normal condition.

1.4 Executive Ringback Trunk Circuit Seizure

Following the busy/idle check and the class of service check, the marker 119 will either seize the executive ringback trunk 116 if the called station 110*a* is busy or, if the called station 110*a* is idle the intercom trunk 115 will be seized to complete the connection. This latter connection is of no further interest in this context and will not be pursued farther. For the situation where the called station 110*a* is busy, the 2-BC relay is actuated causing a normally open contact 2-BC-1 to close. In addition, if the called station 110*a* is busy, the idle check relay 2-IC is not actuated and its normally closed contact 2-IC-1 remains closed. With the states of these two relays being as noted, a battery potential of −48 volts is applied to the ringback trunk circuit 116 through a line protection diode D3 to a 2-OF relay thereby actuating it and seizing the ringback trunk 116.

1.5 Path Completion to Calling Station

Subsequent action by marker 119 results in an idle path through the multistage switching network 113 being selected and a signaling path being completed to the calling station 111*a*. Completion of this path subjects the calling station 111*a* to the control of a supervisory relay 4-S, as shown in FIG. 4. Actuation of the supervisory relay 4-S is effected by completion of a loop through the calling station 111a via a normally closed contact 3-AR-8 of a 3-AR relay in a ring lead RO and a normally closed contact 3-AR-6 in a tip lead TO. The operation of relay 4-S via the tip and ring crosspoint connection to the calling station loop provides talking battery to the calling station 111*a*.

In addition to the foregoing, operation of relay 4-S causes an off normal relay 3-ON, shown in FIG. 3, to be actuated by application of ground through a normally open contact 4-S-2 and a normally closed contact 4-RLS-10 of a 4-RLS relay. Operation of the relay 3-ON closes a normally open contact 3-ON-10 closing a resistive-capacitive slow release loop around relay 3-ON. The resistive-capacitive loop is comprised of a resistor R6 and a capacitor C8 which, in the preferred embodiment, had values of 1500 ohms and 200 microfarads, respectively. A normally closed contact 3-CT-4 is included in the slow release loop for disabling it during other operations of relay 3-ON.

Operation of the 3-ON relay also partially enables a special busy signal path BA, as shown in FIG. 4, to provide a time shared busy signal, derived from a busy signal source 420 and a 440 Hertz tone provided by oscillator 422 via amplifier 423, to the calling station 111a via the tip and ring leads TO and RO, respectively, by closing a normally open contact 3-ON-5. A capacitor C3 is included in this path for DC isolation purposes.

Relay contact 4-FBTO-1 provides a time sharing between the two signals previously mentioned. This time sharing is effected by relays 4-FBTO and 4-FBT1 which are connected together to form a relay multivibrator of a type well known in the art. The relay multivibrator operates when normally open contact 3-ON-8 is closed and normally closed contact 3-RBT-3 remains closed.

In addition to the foregoing, actuation of the relay 3-ON causes an operate path for a relay 4-CHK to be prepared by closing a normally open contact 3-ON-9. Also, the closure of a normally open contact 3-ON-11, as shown in FIG. 3, provides a ground potential to one side of a 3-ON1 relay, the other side of which is held at a battery potential of −48 volts, thereby actuating it. With the relay 3-ON1 operated, an operate path for a relay 3-CHKA is prepared by closing a normally open contact 3-ON1-1. Operation of the relay 3-ON1 also provides holding grounds for relays 3-CT and 3-AR by closing normally open contacts 3-ON1-7 and 3-ON1-3, respectively. Closure of a normally open contact 3-ON1-6 prepares a ground start path for a delay timer $\tau 2$ associated with the relay 3-CT. Also, a battery start path for a ring counter 424, as shown in FIG. 4, is prepared by the closure of a normally open contact 3-ON1-8.

1.6 Path Completion Through Executive Ringback Trunk to Called Station

Following actuation of the 3-ON and 3-ON1 relays a tip and ring crosspoint connection to the called station 110*a* is completed by the marker 119 selecting an idle path through the multistage switching network 113. Completion of the tip and ring crosspoint connection to the called station 110*a* provides a battery potential to operate the check line relay 4-CHK. The battery potential to actuate the 4-CHK relay is supplied over a tip lead TT through a line isolation diode D-CHK1 or over a ring lead RT through a similar line isolation diode D-CHK2 to a series connected pair of normally closed contacts 3-AR-4 and 4-CHK-5 and the normally open contact 3-ON-9. A resistor R3 is connected across normally closed contact 4-CHK-5. Resistor R3 keeps the current flow at a level just sufficient to maintain actuation of the relay 4-CHK following its initial operation. Minimization of the current flow is necessary if the drain on the called station loop is to be kept at a low level. A resistance value for resistor R3 of 19.1 kilohms has been found suitable for this purpose.

With relay 4-CHK actuated, the ground path for actuation of the 3-CHKA relay is completed by the closure of a normally open contact 4-CHK-10. The release time of the relay 3-CHKA is controlled by a resistive-capacitive loop containing a resistor R7 and a capacitor C9 in a series path containing a pair of normally open contacts 3-ON1-2 and 3-CHKA-2. A resistance value for resistor R7 of 1500 ohms and a capacitance value for capacitor C9 of 200 microfarads are used in the preferred embodiment.

If the called station 110*a* is busy but is not ringing or is not camped-on, a relay 4-SL in a sleeve lead ST is operated by supplying battery from the called station 110*a* through a line protection DC blocking diode D-SL. With the 4-SL relay operated it is held operated by the application of battery potential through a normally open contact 4-SL-5 with ground being provided through a normally open contact 3-ON-8. The grounding of lead ST by the closure of a normally open contact 4-SL-3 serves as a camp-on denial signal for subsequent connections to the called station 110*a*.

In addition to the controlling of the sleeve lead ST, actuation of the relay 4-SL closes a normally open contact 4-SL-1, as shown in FIG. 3 allowing battery potential of −48 volts to be applied to a flash detect relay 3-X. The battery path for the 3-X relay also includes a normally closed contact 3-CB-11 and a normally open contact 3-ON1-5 which had been closed previously. Ground path for actuation of the relay 3-X includes a normally open contact 4-S-8 and a normally closed contact 3-X-8. Once the relay 3-X is actuated, a ground lock path is provided through a normally open contact 3-X-8. Actuation of the 4-SL relay also closes the special busy signal path BA to the calling station 111a by closing normally open contact 4-SL-2. The supplying of the special busy signal back to the calling station 111*a* occurs whenever the called station 110*a* is busy from other than a camp-on or a ringing condition. In these two cases a normal busy tone is returned to the calling station 111*a* indicating that the request for ringback is denied.

If the relay 4-SL does not operate, due to a ground condition on sleeve lead ST, indicating a camp-on or ringing condition, the relay 3-X will not operate. With relay 4-SL unoperated, the normal busy tone from the busy tone source 420 is provided to the calling station 111*a* through a path containing the normally open contact 3-ON-5. The relay 4-SL is held normal after the release of marker 119 by the application of ground on lead ST through a normally open contact 3-ON1-11 and the normally closed contact 2-OF-2. When the marker 119 releases, the relay 2-OF also releases thereby removing the bridged sleeve connection which initially grounded the sleeve lead ST. Consequently, with the relay 4-SL held normal the calling station 111*a* is unable to initiate a switchhook flash sequence which enables the ringback feature.

1.7 Calling Station Enables Ringback

Actuation of the executive ringback trunk 116 is effected in response to a switchhook flash at the calling station 111*a*. With the executive ringback trunk 116 enabled a 440 Hertz tone is supplied to both the calling station 111*a* and the called station 110*a* for approximately 750 milliseconds. After the 440 Hertz tone is removed the calling party may go on-hook and remain on-hook until the connection between the called station 110*a* and the third party station 112 is concluded.

The switchhook flash at the calling station 111*a* causes the supervisory relay 4-S to release which, in turn, removes a shunt ground applied to a flash detect relay 3-Y through normally open contact 4-S-8 and a normally closed contact 3-Y-5, as shown in FIG. 3. Removal of the shunt ground from relay 3-Y allows it to operate with battery potential being supplied through normally open contacts 4-SL-1 and 3-ON1-5 and normally closed contact 3-CB-11. If the calling station 111a returns to an off-hook condition within approximately 1.2 seconds of depression of the switchhook for a flash, the supervisory relay 4-S reoperates via the held crosspoint connection to the calling station loop. The 1.2 second time interval is controlled by the resistor R6 and the capacitor C8 across the control winding of relay 3-ON. Insertion of resistor R6 and capacitor C8 into the control winding of relay 3-ON is implemented by the closure of the normally open contact 4-S-2. The reoperation of relay 4-S causes relay 3-X to be released while relay 3-Y remains in an operated condition.

With relay 3-Y operated a ground path to operate a relay 3-RBT is completed through normally open contacts 3-ON1-6, 3-Y-2, 4-CHK-8 and normally closed contacts 3-X-11 and 3-RBT-7. A diode D-RBT is connected between the source of battery potential and a ground input of delay timer $\tau 2$ to prevent application of the battery potential to this input. The operation of relay 3-Y also provides the ground to the input of delay timer $\tau 2$ and it maintains a release shunt path for relay 3-X by placing a ground potential on both sides of the relay 3-X.

Operation of the relay 3-RBT opens the special busy signal path BA to the calling station 111*a*, as shown in FIG. 4, by opening a normally closed contact 3-RBT-1. The ground return path for the special busy signal comprising a normally open contact 3-ON-4, a normally closed contact 3-RBT-2 and a capacitor C4 is also broken by the opening of the normally closed contact 3-RBT-2. Capacitor C4 provides an AC ground return path and in the preferred embodiment had a value of 0.1 microfarads. At the same time, a 440 Hertz tone generated by oscillator 422 and level controlled by amplifier 423 is transmitted to both the calling station 111*a* and the called station 110*a*. The 440 Hertz tone applied to the calling station 111*a* is over a path containing a capacitor C5, a resistor R11, a normally closed contact 3-CT-2 and a pair of normally open contacts 4-CHK-2 and 3-RBT-4. Similarly, the 440 Hertz tone applied to the called station 110*a* is over a path containing a capacitor C13, a resistor R10, a normally closed contact 3-CT-3 and a pair of normally open contacts 4-CHK-4 and 3-RBT-5. Resistors R10 and R11 and capacitors C5 and C13 provided tone level control and DC isolation, respectively, in the 440 Hertz tone path. In one embodiment resistors R10 and R11 had values of 10 kilohms and the capacitors C5 and C13 had values of 0.04 microfarads.

With the input to the delay timer $\tau 2$ grounded by the closure of normally open contact 3-Y-2, as shown in FIG. 3, a ground is supplied to one side of the relay 3-CT through a path containing a transient protection diode D-CT1 and a normally closed contact 3-CT-11. The other side of relay 3-CT is held at a battery potential of −48 volts through a normally closed contact 3-CB-10. Actuation of the relay 3-CT is maintained by a ground lock path through normally open contacts 3-ON1-7 and 3-CT-11. A diode D-CT2 is connected across the winding of the relay 3-CT for protection against transient voltages generated by relay contact closures. The actual operation of the relay 3-CT is delayed by approximately 750 milliseconds and this delay is provided by delay timer $\tau 2$. Fine adjustment on the length of the delay is controlled by a resistor R5 and a capacitor C10. In the preferred embodiment resistor R5 had a value of 931 kilohms and capacitor C10 had a value of two microfarads. With the operation of the relay 3-CT, the 440 Hertz tone applied to the calling station 111*a* and the called station 110*a* is removed by opening the normally closed contacts 3-CT-2 and 3-CT-3 in the 440 Hertz tone path.

During the 750 millisecond interval a switchhook flash by the calling station 111*a* will not be recognized because of the maintenance of a ground potential to the flash detect circuit comprising relays 3-X and 3-Y through a normally closed contact 3-CT-12 and a normally open contact 3-RBT-9. Following the operation of the relay 3-CT an additional ground holding path for the relay 3-ON is provided by the closure of a normally open contact 3-CT-12.

After the 440 Hertz tone is removed, the calling station 111*a* may go on-hook at which time relay 4-S releases. This, in turn, releases relay 3-Y. However, relay 3-ON is held operated by the relay 3-CT and the continued actuation of relay 3-ON maintains ground on sleeve lead SO through the normally open contact 3-ON-8 thereby holding the connection to the calling station 111*a*.

1.8 Called Station Goes Idle

When the called station 110*a* goes idle at the conclusion of the connection with the third party station 112, a ringing signal is supplied to both the called station 110*a* and the calling station 111*a*. If both stations affirmatively respond to this ringing signal a talking path is established between the calling station 111*a* and called station 110*a*. The establishment of this talking path is effected in the manner hereinafter described.

When the called station 110*a* goes idle the operate battery for relay 4-CHK is removed causing it to release which, in turn, causes the release of the 3-CHKA relay. The release of the relay 3-CHKA causes the actuation of the apply ringing relay 3-AR. This actuation if effected by the application of a ground to one side of the 3-AR relay through a path containing a normally open contact 3-CT-6 and a pair of normally closed contacts 3-CHKA-3 and 3-AR-11. With the operation of the 3-AR relay a ground lock path is provided through a pair of normally open contacts 3-ON1-3 and 3-AR-11. Battery potential for the actuation of the 3-AR relay is supplied through a normally closed contact 3-CB-12.

Operation of the relay 3-AR opens the operate path for the relay 4-CHK by opening normally closed contact 3-AR-4. In addition, the operation of the relay 3-AR provides a holding ground for the operation of a relay 4-RT1 through a normally open contact 3-AR-5. A further effect of the operation of the relay 3-AR is that a ringing signal from a ringing source 421 is supplied to both the calling station 111*a* and the called station 110*a* over ring leads R0 and RT, respectively, via relays 4-RT1 and 4-RT. The ringing signal path to the calling station 111*a* includes normally open contacts 3-ON-2 and 3-AR-8 and a normally closed contact 4-RT1-7. Correspondingly, the ringing signal supplied to the called station 110*a* is over a path including normally open contacts 3-ON-7 and 3-AR-10 and a normally closed contact 4-RT-7. A ground return path for the ringing signal is provided from tip lead TT through normally closed contact 4-RT-5 and normally open contacts 3-ON-6 and 3-AR-12 to a ground point via ground lead RG, and from tip lead TO through normally open contacts 3-AR-6 and 3-ON-1 and normally closed contact 4-RT1-5. The ringing signal is also coupled to the ring counter 424 through a normally open contact 3-AR-1 and a normally closed contact 4-S-6.

1.9 Both Stations Answer within a Predetermined Number of Rings

With the ringing signal supplied to both the calling station 111*a* and the called station 110*a* the answering by each of these stations within a predetermined number of rings causes a talking path to be established. When the calling station 111*a* answers, the relay 4-RT1 is operated via its station loop. Relay 4-RT1 is locked operated via its secondary winding by the closure of a normally open contact 4-RT1-12. In addition, the operation of the relay 4-RT1 provides an operate path for the relay 4-S via the calling station loop through normally open contacts 3-AR-6, 3-AR-8, 4-RT1-5 and 4-RT1-7. The operation of relay 4-RT1 also opens a ground holding path for relay 3-ON by opening normally closed contact 4-RT1-9. The ringing path to the calling station 111*a* is opened by the operation of the relay 4-RT1 by the opening of normally closed contact 4-RT1-7.

Audible ringback of the ringing signal supplied to the called station 110*a* is returned to the calling station 111*a* via a path including the normally open contact 3-ON-7, the normally closed contact 4-RT-7, a pair of normally open contacts 3-RBT-11 and 3-AR-2, and capacitors C6 and C12. In the preferred embodiment capacitors C6 and C12 had values of 0.04 microfarads and 2.15 microfarads, respectively.

The reactuation of the relay 4-S provides talk battery to the calling station 111*a*. Furthermore, reactuation of relay 4-S reoperates relay 3-X. When the called station 110*a* answers, the relay 4-RT is operated via the called station loop. Operation of the relay 4-RT is locked via its secondary winding by the closure of normally open contact 4-RT-12. It should be noted that a normally open contact 3-ON-12 had been closed by a previous actuation of the 3-ON relay. With the actuation of the relay 4-RT an operate path for a destination supervisory relay 4-D is provided via the station loop of the called station 110*a*. This operate path for the relay 4-D through the station loop of the called station 110*a* includes normally open contacts 4-RT-5, 3-AR-12, 3-AR-10 and 4-RT-7. With the actuation of relay 4-RT the normally closed contact 4-RT-7 is opened which, in turn, opens the ringing signal path to the called station 110*a*. Finally, actuation of the 4-RT relay provides a tip and ring transmission path via normally open contacts 4-RT-5 and 4-RT-7 and capacitors C11 and C12 to the calling station 111*a*. In the preferred embodiment capacitor C11 had a value of 2.15 microfarads.

Talk battery to the called station 110*a* is provided by the operation of the 4-D relay. At this point, the tip and ring path TO and RO to the calling station 111*a* and the tip and ring path TT and RT to the called station 110*a* are individually supervised and capacitively coupled. No further action occurs until the calling station 111*a* releases at which time executive ringback trunk circuit 116 restores to an idle condition.

1.10 Called Station Does Not Answer

If the called station 110*a* does not answer, the calling station 111*a* may disconnect by going on-hook. When this occurs relay 4-S releases which, in turn, operates relay 3-Y. Previously operated relay 3-CT and an operated 3-Y relay combine to operate a relay 3-CB by providing a ground through normally open contacts 3-Y-1, 3-X-12 and 3-CT-9. A diode D-CB is connected across the control winding of the relay 3-CB for increasing its release time. The operation of the relay 3-CB causes the release of relays 3-X, 3-Y, 3-CT, 3-AR and 3-RBT by breaking the battery supply paths through the opening of normally closed contacts 3-CB-11, 3-CB-10 and 3-CB-12. In the case of the relay 3-RBT, operation of the relay 3-CB breaks a ground holding path comprised of a normally closed contact 3-CB-8 and normally open contacts 3-ON-3 and 3-RBT-7. With the release of relays 3-CT and 3-Y the relay 3-CB is also released by the opening of ground holding paths comprised of normally open contacts 3-CT-1, 3-Y-3 and 3-CB-9.

The release of relays 4-S and 3-CT breaks the operate path for relay 3-ON by the opening of normally open contacts 4-S-2 and 3-CT-12 which previously had been closed. The release of relay 3-ON further causes the release of relay 3-ON1. With the release of relays 3-ON and 3-ON1 all holding grounds are removed at which time the executive ringback trunk circuit 116 restores to an idle condition.

1.11 Calling Station Does Not Answer Within a Predetermined Number of Rings

If the called station 110*a* answers as described previously but the calling station 111*a* does not answer, audible ringback is returned to the called station 110*a* via capacitors C1, C2, C11, C12; normally open contacts 4-RT-7, 3-AR-10, 4-RT-5, 3-AR-12; and the primary winding of relay 4-RT1 including normally open contacts 3-ON-2 and 3-AR-8 and normally closed contact 4-RT1-7. This condition will persist for a predetermined number of ringing cycles, which in the preferred embodiment was chosen to be eight, after which the ring counter 424 is operated which, in turn, operates release relay 4-RLS. A diode D-RLS is connected across the control winding of the relay 4-RLS for transient protection purposes. Actuation of the relay 4-RLS opens the ground path to the relay 3-ON thereby releasing it which, in turn, releases relay 3-ON1. Relays 3-ON and 3-ON1 released open all holding grounds and the executive ringback trunk circuit 116 is restored to an idle condition.

1.12 Calling Station Does Not Wait for Called Station to Go Idle

When a ringback condition is initiated as described previously but the calling station 111*a* decides not to wait until the called station 110*a* goes idle, the calling station 111*a* may completely release the connection by going off-hook and back on-hook again. With the calling station 111*a* going off-hook relay 4-S operates which, in turn, operates relay 3-X. When the calling station 111*a* goes back on-hook relay 4-S releases which, in turn, operates relay 3-Y. With the operation of relay 3-Y in conjunction with the previous operation of relay 3-CT a ground operate path is provided for the relay 3-CB. Operation of relay 3-CB causes the release of relays 3-X, 3-Y, 3-CT, 3-AR and 3-RBT as heretofore described. The release of relay 3-CT then causes the release of relay 3-CB. As relays 4-S and 3-CT return to a normal state, the operate path for relay 3-ON is opened causing it to release which, in turn, causes the release of relay 3-ON1. Relays 3-ON and 3-ON1 released, remove all holding grounds and the circuit restores to an idle condition.

1.13 Calling Station Enables Ringback Subsequent to Called Station Going Idle

When the calling station 111*a* initiates a switchhook flash the executive ringback trunk circuit 116 functions as described previously in Section 1.7. Also the relay 3-CT is actuated because relays 4-CHK and 3-CHKA are released when the called station 110*a* goes idle. The operate path for relay 3-CT is via normally open contacts 3-ON1-7 and 3-Y-4 and normally closed contacts 3-X-10, 4-CHK-7 and 3-CB-10. The operation of relay 3-CT opens the 440 Hertz tone path by opening normally closed contacts 3-CT-2 and 3-CT-3 thereby preventing tone application, as described in Section 1.7 above, prior to the ringing of the called station 110*a*. In addition, with relay 3-CT operated and relay 3-CHKA in an unoperated state, relay 3-AR is actuated by the application of ground via a path containing normally open contact 3-CT-6 and normally closed contacts 3-CHKA-3 and 3-AR-11. Battery potential for the actuation of the relay 3-AR is supplied through a normally closed contact 3-CB-12. With relay 3-AR actuated ringing is supplied to the called station 110*a* as described heretofore in Section 1.8. Since the station loop is maintained by the calling station 111*a* relay 4-RT1 is immediately operated and the ringing path to the calling station 111*a* is held open preventing the application of the ringing signal to it.

1.14 Summary

In summary, circuitry for permitting a calling station 111*a*, equipped with a class of service which allows executive ringback, to automatically obtain a ringback of a call placed to a busy called station 110*a*, also equipped with a class of service which permits executive ringback, has been described. Implementation of the executive ringback feature is instituted by a switchhook flash at the calling station 111*a* in response to a special busy signal from the called station 110*a*. Upon receipt of the switchhook flash the executive ringback circuitry supplies an executive ringback alerting signal to both the called station 110*a* and the calling station 111*a*. At this point the calling station 111*a* may go on-hook and at the conclusion of the connection between the called station 110*a* and the third party station 112 both the calling and called stations receive a ringback signal. If the ringback signal goes unanswered by the calling party after a predetermined number of rings, the executive ringback circuitry is automatically released. As an added feature, should the called station 110*a* go idle prior to the initiation of a switchhook flash by the calling station 111*a* a ringing signal is immediately supplied to the called station 110*a* and a talking path is established as soon as the called station 110*a* answers.

In all cases it is to be understood that the above-described embodiment is illustrative of but a small number of many possible specific embodiments which can represent applications of the principles of the invention. Thus, numerous and varied other embodiments can readily be devised in accordance with these principles by those skilled in the art without departing from the spirit and scope of the invention.

What is claimed is:

1. In a telephone switching system having a plurality of line circuits terminated in station sets, said line circuits being interconnectable to a plurality of trunk circuits through a multistage switching network, the invention comprising executive ringback circuitry for completing a connection between a calling station and a called station at the conclusion of a connection between said called station and a third party station, said executive ringback circuitry including means for determining the class of service provided to said calling station, means for detecting a busy condition of said called station, means for determining a class of service provided to said called station, means, responsive to said calling station class of service determining means, said called station busy condition detecting means, and said called station class of service determining means, for seizing said executive ringback circuitry provided said calling station is equipped with a class of service permitting executive ringback and said called station is equipped with a class of service allowing executive ringback, and means, subsequently activated by said seizing means and responsive to a switchhook flash from said calling station, for effecting the establishment of executive ringback connections between said calling station and said called station at the conclusion of said connection between said called station and said third station.

2. The telephone switching system in accordance with claim 1 wherein the executive ringback circuitry further includes means for alerting said busy called station for a predetermined time interval that executive ringback is to be effected, and means for controlling the duration of said predetermined time interval.

3. The telephone switching system in accordance with claim 1 wherein the executive ringback circuitry further includes means, activated by said effecting means, for providing an executive ringback acknowledgment signal for a predetermined time interval to said calling station in response to said switchhook flash, and means for controlling the duration of said predetermined time interval.

4. The telephone switching system in accordance with claim 1 wherein the executive ringback circuitry further includes means for denying executive ringback to said calling station when said called station is busy as a result of a previous camp-on connection.

5. The telephone switching system in accordance with claim 1 wherein the executive ringback circuitry further includes means for detecting a return to an idle condition of said called station, and means for establishing a talking path between said calling and called stations.

6. The telephone switching system in accordance with claim 5 wherein the executive ringback circuitry further includes means, responsive to said switchhook flash enabling signal from said calling station, for holding said seizure of said executive ringback circuitry until said busy called station goes idle, and means, responsive to said detection of a return to an idle condition of said called station, for supplying a predetermined number of ringing signals to said calling and called stations.

7. The telephone switching system in accordance with claim 6 wherein the executive ringback circuitry further includes means, activated by said calling station going off-hook in response to said ringing signals within said predetermined number of said signals, for disconnecting said ringing signal supply means from said calling station, means for supplying an audible ringback signal to said calling station, and means, activated by said called station going off-hook in response to said ringing signals within said predetermined number of said signals, for disconnecting said ringback signal supply means from said calling station.

8. The telephone switching system in accordance with claim 6 wherein the executive ringback circuitry further includes means, activated by said called station going off-hook in response to said ringing signals within said predetermined number of said signals, for disconnecting said ringing signal supply means from said called station, means for supplying an audible ringback signal to said called station, and means, activated by said calling station going off-hook in response to said ringing signals within said predetermined number of said signals, for disconnecting said ringback signal supply means from said called station.

9. The telephone switching system in accordance with claim 6 wherein the executive ringback circuitry further includes means for detecting a failure of said calling station to respond to said ringing signals within said predetermined number of said signals, and means, activated by said detecting means, for releasing said seized executive ringback circuitry at the termination of said predetermined number of ringing signals.

10. The telephone switching system in accordance with claim 6 wherein the executive ringback circuitry further includes means, activated by said ringing signal supply means and responsive to a return to an idle state by said calling station, for releasing said seized executive ringback circuitry.

11. Circuitry for controlling the establishment of executive ringback connections between a calling station having a class of service which permits it to effect ringback call connections and a busy called station having a class of service which permits the establishment of a ringback call connection upon the termination of a previously established call connection with a third party station, said circuitry comprising means, responsive to a call from said calling station to said called station, for detecting a busy condition of said called station, and means, subseqently activated by said detecting means and responsive to a switchhook flash from said calling station, for effecting the establishment of call connections between said calling station and said busy called station at the conclusion of said connection between said third party station and said busy called station.

12. Executive ringback circuitry comprising means for seizing said circuitry in response to a call from a calling station, having a class of service which permits it to effect ringback call connections, to a busy called station, having a class of service which permits the establishment of a ringback call connection upon the termination of a previously established call connection, and means, responsive to a receipt of a switchhook flash from said calling station, for establishing executive ringback connections between said calling station and said called station.

13. The executive ringback circuitry in accordance with claim 12 further comprising means, activated by said establishing means, for supplying an executive ringback signal over said established connections to said calling station and said called station for a predetermined time interval.

14. The executive ringback circuitry in accordance with claim 13 further comprising means, activated upon termination of said executive ringback signal, for holding said seized executive ringback circuitry and said established connections between said calling and called stations until said called station goes idle, means for detecting a return to an idle condition of said called station, and means, responsive to said detection of a return to an idle condition of said called station, for supplying a predetermined number of ringing signals to said calling and called stations.

* * * * *